US010099401B2

(12) United States Patent
Jensen et al.

(10) Patent No.: US 10,099,401 B2
(45) Date of Patent: Oct. 16, 2018

(54) DEBARKING CHAIN WITH PASSING LINKS

(71) Applicants: Robert D. Jensen, Winona, MN (US);
John J. McCauley, Winona, MN (US)

(72) Inventors: Robert D. Jensen, Winona, MN (US);
John J. McCauley, Winona, MN (US)

(73) Assignee: Peerless Chain Company, Winona, MN (US)

( * ) Notice: Subject to any disclaimer, the term of this patent is extended or adjusted under 35 U.S.C. 154(b) by 473 days.

(21) Appl. No.: 14/744,813

(22) Filed: Jun. 19, 2015

(65) Prior Publication Data

US 2015/0283726 A1 Oct. 8, 2015

Related U.S. Application Data

(63) Continuation of application No. 13/338,850, filed on Dec. 28, 2011, now Pat. No. 9,102,075, which is a continuation of application No. 13/005,929, filed on Jan. 13, 2011, now Pat. No. 8,210,217, which is a (Continued)

(51) Int. Cl.
*B27L 1/12* (2006.01)
*A01G 23/097* (2006.01)

(52) U.S. Cl.
CPC ............ *B27L 1/122* (2013.01); *A01G 23/097* (2013.01)

(58) Field of Classification Search
CPC ....... A01G 23/097; B27L 1/12; B27L 1/1127; B27L 1/122; F16G 13/12; F16G 13/18; F16G 15/12
See application file for complete search history.

(56) References Cited

U.S. PATENT DOCUMENTS

| 1,548,273 A | 8/1923 | Lester |
| 1,530,940 A | 3/1925 | Herman |
| 1,552,498 A | 9/1925 | Noyes |

(Continued)

FOREIGN PATENT DOCUMENTS

| CN | 101564857 A | 10/2009 |
| DE | 41 09 704 A1 | 1/1992 |

(Continued)

OTHER PUBLICATIONS

USPTO—Prosecution History of U.S. Appl. No. 11/279,502, "Debarking Chain with Passing Links", Apr. 12, 2006-Dec. 22, 2010, USPTO, U.S.

(Continued)

*Primary Examiner* — Matthew G Katcoff
(74) *Attorney, Agent, or Firm* — Moore & Hansen, PLLC; Robert C. Freed

(57) ABSTRACT

A debarking chain having passing links; the passing links being substantially rounded in order to permit the passing links to pass through adjacent links such that the orientation of the passing link relative to its adjacent links can change at random in order to randomly distribute the wear and stress from any impact of adjacent or next to adjacent links on the passing links so that the overall wear life of the present debarking chain is extended over similar chain with elongated, oblong links of the prior art. The invention also includes a debarking drum having a plurality of debarking chains having at least one, preferably a plurality of passing links, as well as a debarking device having such a debarking drum. The debarking device preferably includes a chipping device and a method of using the same.

11 Claims, 8 Drawing Sheets

Related U.S. Application Data continuation of application No. 11/279,502, filed on Apr. 12, 2006, now Pat. No. 7,878,227.

(60) Provisional application No. 60/671,012, filed on Apr. 13, 2005.

(56) References Cited

U.S. PATENT DOCUMENTS

| | | | |
|---|---|---|---|
| 1,567,505 | A | 12/1925 | Holmes |
| 1,593,167 | A | 7/1926 | Frambach |
| 1,594,085 | A | 7/1926 | Wills |
| 1,621,287 | A | 3/1927 | Speidel |
| 1,670,723 | A | 5/1928 | Hummel |
| 2,001,227 | A | 1/1935 | Vogel-Jorgensen |
| 2,069,980 | A | 2/1937 | Stahl |
| 2,125,967 | A | 8/1938 | Winthrop et al. |
| RE20,892 | E | 10/1938 | Bambenek et al. |
| 2,171,995 | A | 9/1939 | Schmidt, Jr. |
| 2,190,130 | A | 2/1940 | Stahl |
| 2,520,421 | A | 8/1950 | Mathewson et al. |
| 2,867,252 | A | 1/1956 | Dillingham |
| 2,785,578 | A | 3/1957 | Nold |
| 2,795,320 | A | 6/1957 | Dillingham |
| 2,831,317 | A | 4/1958 | Watkins |
| 2,876,812 | A | 3/1959 | Waldron |
| 2,966,878 | A | 1/1961 | Feiser, Jr. |
| 3,135,504 | A | 6/1964 | Chisler |
| 3,425,213 | A | 2/1969 | Roselman |
| 3,427,801 | A | 2/1969 | McLeish |
| 3,435,861 | A | 4/1969 | Shields |
| 3,820,817 | A | 6/1974 | Harold |
| 3,830,054 | A | 8/1974 | Tamamaura et al. |
| 3,862,653 | A | 1/1975 | Fay et al. |
| 4,012,618 | A | 3/1977 | Ebel et al. |
| 4,075,451 | A | 2/1978 | Wust |
| 4,110,971 | A | 9/1978 | Bruce |
| 4,222,418 | A | 9/1980 | McCray et al. |
| 4,572,258 | A | 2/1986 | Mischel |
| 4,640,325 | A | 2/1987 | Vaders |
| 4,660,611 | A | 4/1987 | Gockley et al. |
| 4,690,187 | A | 9/1987 | Schmidt |
| 4,711,280 | A | 12/1987 | Schmidt |
| 4,738,292 | A | 4/1988 | Turpeinen |
| 5,148,844 | A | 9/1992 | Robison |
| 5,322,104 | A | 6/1994 | Morey et al. |
| 5,343,912 | A | 9/1994 | Chronister et al. |
| 5,349,999 | A | 9/1994 | Peterson et al. |
| 5,419,379 | A | 5/1995 | Schmidt |
| 5,511,596 | A | 4/1996 | Wardell, Jr. et al. |
| 5,537,812 | A | 7/1996 | Rozenwasser |
| 5,638,879 | A | 6/1997 | Robison et al. |
| 5,660,036 | A | 8/1997 | Rozenwasser |
| 5,738,329 | A | 4/1998 | Woodard |
| 6,256,974 | B1 | 7/2001 | Shanks, Sr. |
| 6,460,323 | B1 | 10/2002 | Rozenwasser et al. |
| 7,310,934 | B1 | 12/2007 | Jensen et al. |
| D560,602 | S | 1/2008 | Neri et al. |
| 7,878,227 | B2 | 2/2011 | Jensen et al. |
| 2004/0060203 | A1 | 4/2004 | Briscoe |
| 2004/0093848 | A1 | 5/2004 | Dudley et al. |

FOREIGN PATENT DOCUMENTS

| | | |
|---|---|---|
| GB | 311946 | 5/1929 |
| GB | 886895 | 1/1962 |
| GB | 2233260 | 1/1991 |
| SU | 1421428 A1 | 9/1988 |
| WO | WO-2010/129935 | 11/2010 |

OTHER PUBLICATIONS

USPTO—Prosecution History of U.S. Appl. No. 13/005,929, "Debarking Chain with Passing Links", Jan. 13, 2011-Nov. 14, 2011, USPTO, U.S.

EPO—Search Report for European Application No. 06769827-4, dated Nov. 24, 2008, European Patent Office, Europe.

IP Australia—Examiner's First Report for Australian Application No. 2006244311, dated Dec. 8, 2010, IP Australia, Australia.

IP Australia—Examiner's Report No. 2 for Australian Application No. 2006244311, dated Sep. 15, 2011, IP Australia, Australia.

IP Australia—Examiner's Report No. 3 for Australian Application No. 2006244311, dated Dec. 22, 2011, IP Australia, Australia.

IP Australia—Examiner's Report No. 4 for Australian Application No. 2006244311, dated Feb. 16, 2012, IP Australia, Australia.

PCT International Searching Authority—PCT/US2010/034143—International Search Report and Written Opinion, dated Jul. 19, 2010, ISA/US, U.S.

IP Australia—Communication to Associate acting on behalf of Peerless Chain Company in Australia regarding Material filed under Section 27(1) of the Patents Act 1990 for Australian Application No. 2006244311, dated Dec. 16, 2011, IP Australia, Australia.

Baddeley, Richard—Communication (Material filed under Section 27(1) of the Patents Act 1990) to IP Australia regarding Australian Application No. 2006244311, dated Oct. 12, 2011, Watermark (IP Law Firm), Australia.

Canadian Intellectual Property Office—Communication to Associate acting on behalf of Peerless Chain Company in Canada regarding prior art filed under Section 34.1 of the Patent Act by Shapiro Cohen in Canadian Patent Application No. 2,604,986, dated Dec. 2, 2011, CIPO, Canada.

Canadian Intellectual Property Office—Communication to Shapiro Cohen regarding his submission of prior art under Section 34.1 of the Patent Act in Canadian patent Application No. 2,604,986, Dec. 2, 2011, CIPO, Canada.

Cohen, Shapiro—Submission under Section 34.1 of the Patent Act for Canadian Patent Application No. 2,604,986—dated Nov. 29, 2011, Shapiro Cohen, Kanata, Ontario, Canada.

IP Australia—Communication to Associate acting on behalf of Peerless Chain Company in Australia regarding Material filed under Section 27(1) of the Patents Act 1990 for Australian Application No. 2006244311, dated Feb. 7, 2012, IP Australia, Australia.

Baddeley, Richard—Communication (Material filed under Section 27(1) of the Patents Act 1990) to IP Australia regarding Australian Application No. 2006244311, dated Feb. 3, 2012, Watermark (IP Law Firm), Australia.

IP Australia—Communication to Associate acting on behalf of Peerless Chain Company in Australia regarding Material filed under Section 27(1) of the Patents Act 1990 for Australian Application No. 2006244311, dated May 10, 2012, IP Australia, Australia.

Baddeley, Richard—Communication (Material filed under Section 27(1) of the Patents Act 1990) to IP Australia regarding Australian Application No. 2006244311, dated May 8, 2012, Watermark (IP Law Firm), Australia.

Peerless Chain Company—Australian Application No. 2006244311, "Request to Amend a Complete Specification" (Response to Examiner's report dated Dec. 8, 2010)—dated Aug. 10, 2011, FB Rice, Australia.

Peerless Chain Company—Australian Application No. 2006244311, "Request to Amend a Complete Specification" (Response to Examiner's report dated Sep. 15, 2011)—dated Dec. 8, 2011, FB Rice, Australia.

Peerless Chain Company—Australian Application No. 2006244311, Response to Examiner's report dated Dec. 22, 2011—dated Jan. 5, 2012, FB Rice, Australia.

Peerless Chain Company—Australian Application No. 2006244311, "Request to Amend a Complete Specification" (Response to Examiner's report dated Feb. 16, 2012)—dated May 4, 2012, FB Rice, Australia.

IP Australia—Notice of Acceptance for Australian Application No. 2006244311, dated Jun. 13, 2012, IP Australia, Australia.

Bassler, Gregory A., "Producing Pulp Quality Chips in the Woods: A Short Term Study on Three Portable Delimber-Debarker Systems", Project paper, Department of Forest Engineering, Oregon State University, May 29, 1987.

United States Department of Agriculture Forest Service, "Bark-Peeling Machines and Methods", University of Wisconsin, Revised Aug. 1962.

(56) References Cited

OTHER PUBLICATIONS

Baddeley, Richard—Request for Re-Examination of Australian Patent No. 2012203840 filed with IP Australia, dated Jul. 28, 2014, Watermark (IP Law Firm, Australia.
IP Australia—Notification of Re-Examination Requested for Australian Patent No. 2012203840, dated Aug. 11, 2014, IP Australia, Australia.
IP Australia—Re-Examination Report—Standard Patent—Australian Patent No. 2012203840, dated Aug. 27, 2014, IP Australia, Australia.
Peerless Chain Company—Response to Re-Examination Report—Australian Patent No. 2012203840, dated Sep. 23, 2014, FB Rice, Australia.
Baddeley, Richard—Request for Re-Examination of Australian Patent No. 2012203840 filed with IP Australia, dated Jul. 28, 2014, Watermark (IP Law Firm), Australia.
Baddeley, Richard—Communication in Re-Examination of Australian Patent No. 2012203840 filed with IP Australia, dated Oct. 7, 2014, Watermark (IP Law Firm), Australia.
Baddeley, Richard—Communication in Re-Examination of Australian Patent No. 2012203840 filed with IP Australia, dated Dec. 16, 2014, Watermark (IP Law Firm), Australia.
IP Australia—Notification of Re-Examination Requested for Australia Patent No. 2012203840, dated Aug. 11, 2014, IP Australia, Australia.
IP Australia—Re-Examination Report—Standard Patent—Australian Patent No. 2012203840, dated Oct. 23, 2014, IP Australia, Australia.
IP Australia—Notice of Allowance of Amendment to the Specification—Australian Patent No. 2012203840, dated Jan. 16, 2015, IP Australia, Australia.
IP Australia—Patent Oppositions (Notice re-examination has concluded)—Australian Patent No. 2012203840, dated Jan. 21, 2015, IP Australia, Australia.
IP Australia—Re-examination Report—Standard Application—Australian Patent No. 2012203840, dated Feb. 9, 2015, IP Australia, Australia.
English Translation of SU 1421428 A1, published Sep. 7, 1988.
Armstrong Alar Chain Corp. "Passing Link Chain" advertised on Apr. 4, 2004. Attached from www.chain-cable.com/welded.htm.
Baddeley, Richard—Statement of Grounds of Opposition, field under Sections 59, 104(4) and 223 (6) of the Patents Act 1990 to IP Australia regarding Australian Application No. 2006244311, Dec. 20, 2012, Watermark (IP Law Firm), Australia.
Cox, Simon—"Declaration of Simon Cox", In the Matter of Australian Patent Application No. 2006244311 in the name of Peerless Chain Company and Opposition thereto by Function Chains Pty Ltd., Sep. 19, 2013, Mawson Lakes, South Australia.
Heko Ketten Gmbh, "Kiln Chains", Informational Product Brochure from HEKO Ketten GmbH, Mar. 2004, Ruhr, Germany.
IP Australia—Examiner's Report No. 1 for Australian Application No. 2010245686, dated Mar. 25, 2013, IP Australia, Australia.
IP Australia—Examiner's Report No. 1 for Australian Application No. 2012203840, dated Mar. 6, 2013, IP Australia, Australia.
IP Australia—Notice of Acceptance for Australian Application No. 2012203840, dated Dec. 13, 2013, IP Australia, Australia.
Laclede Chain Manufacturing Co., LLC. "Passing Link" advertised on Dec. 9, 2003. Attached from www.lacledechian.com/hardware/alloypassing.html.
Peerless Chain Company—Australian Application No. 2012203840, "Request to Amend a Complete Specification" (Response to Examiner's report dated Mar. 6, 2013)—dated Nov. 8, 2013, FB Rice, Australia.
Quill, David Thomas—"Declaration of David Thomas Quill", In the Matter of Australian Patent Application No. 2006244311 in the name of Peerless Chain Company and Opposition thereto by Function Chains Pty Ltd, Nov. 4, 2013, Mount Gambier, South Australia.
Ver Sales, Inc. "Passing Link Chain" advertised on Apr. 12, 2004, Attached from www.versales.com.
Wallingford, John—"Declaration of John Wallingford", In the Matter of Australian Patent Application No. 2006244311 in the name of Peerless Chain Company and Opposition thereto by Function Chains Pty Ltd, Jun. 17, 2013, Oakland, ME, USA.
United States Patent and Trademark Office (USPTO)—Prosecution History of U.S. Appl. No. 12/776,364 "Flail Chain", May 7, 2010-Oct. 21, 2013, USPTO, U.S.
United States Patent and Trademark Office (USPTO)— Reexamination Prosecution History of U.S. Appl. No. 90/012,928 "Debarking Chian With Passing Links", Jul. 25, 2013-Feb. 18, 2015, USPTO, U.S.
Wallingford's Inc., "The Only Things We Can't Supply . . . Are the Trees" (Catalog), Nov. 1977, West Forks, Maine.
Myles, Daniel J.C. "Possible Increase in Fibre Utilization Through the Evaluation of a Peterson-Pacific Delimber/Debarker/Chipper (DCC) 5000", Mar. 23, 1992, FPD Report No. 64, The Canada/Newfoundalnd Cooperation Agreement for Forestry Development, Canada.
Watson, W.F. et al., "Review of Chain Flail Delimbing-Debarking", Journal of Forest Engineering, 1993, pp. 37-52, vol. 4, No. 2, University of New Brunswick, Canada.

DEBARKING CHAIN WITH PASSING LINKS

RELATED APPLICATIONS

This application is a continuation of U.S. patent application Ser. No. 13/338,850, filed Dec. 28, 2011, which is a continuation of U.S. patent application Ser. No. 13/005,929, filed on Jan. 13, 2011, now U.S. Pat. No. 8,210,217, which is a continuation of U.S. patent application Ser. No. 11/279,502, filed on Apr. 12, 2006, now U.S. Pat. No. 7,878,227, which claims benefit of U.S. Provisional Application Ser. No. 60/671,012, filed on Apr. 13, 2005, all of which are incorporated herein by reference.

FIELD OF THE INVENTION

The present invention relates to a method and apparatus used for removal of bark and limbs from logs, more specifically, to a flail-type, debarking chain apparatus wherein the debarking chain includes passing links that rotate with respect to adjacent chain links during use. The invention also relates to debarking devices that include a plurality of debarking chains having passing links.

BACKGROUND OF THE INVENTION

It is well known that bark and small limbs can be removed from logs in a debarking device by passing the log between a set of rapidly rotating, upper and lower debarking drums in the debarking device, each of which have a plurality of debarking chains, also called flail chains. The debarking chains repetitively strike the surface of the log with significant force at a high rate of speed, effectively tearing away any small limbs and virtually all of the bark on the log in preparation for a chipping operation in which the log is chipped into small pieces appropriate for further processing into wood pulp for paper manufacturing or the manufacturing of composite products such as chip board, oriented strand board and engineered lumber.

Logs are conveyed lengthwise through the debarking device along a predetermined feed plane. The upper drum is located above the feed plane and the lower drum is located below the feed plane, each at a distance from the feed plane to allow the debarking chains, or flail chains, together to clear bark and limbs from the entire surface of the log. It will be appreciated that each set of debarking chains, associated with respective debarking drums, must reach at least the midpoint of the sides of the log. Some debarking devices have additional debarking drums some of which are fix drums and some of which are often "floating" drums.

It will be appreciated that in prior designs, the debarking chains consist of elongated or oblong chain links that have projected wear life based primarily upon stress applied to the u-shaped end portion of the respective chain links as these links repetitively strike the outer surface of the logs and as these links strike each other when the links recoil following such impacts. This projected wear life dictates frequency of debarking chain replacement. It will be appreciated that any extension of the projected wear life of a set of debarking chains will reduce cost for debarking operations in that extended use will reduce the number of chains used per unit of logs debarked or wood chips generated.

In normal use, a set of debarking chains are generally attached to a debarking drum, used for a predetermined amount of time or until any links are worn to a predetermined amount of wear near the point of breakage based on periodic inspection of the debarking chain, and then disconnected, flipped end to end, before being reattached and used again for another set amount of time or predetermined amount of wear.

Debarking is important in chipping operations, because this processing step minimizes the residual amount of bark mixed into wood chips from subsequent chipping operations. Wood chips are less desirable for pulping operations when they contain bark that is not removed from logs before the logs are chipped.

A greater fear in these operations, however, is that the debarking chains will break and damage the chipper. This is one of the key reasons that operators carefully avoid extending the use of a set of debarking chains beyond the projected wear life for the chains. If any of the chains break and any of the metal links get into the chipper, which is generally rotating at a very high rate of speed, any consequent damage to the chipper can result in added operating costs due to machine downtime and needed replacement parts. Additionally, there exists the risk that breaking links may cause link debris to enter adjacent machinery, causing further damage and downtime.

For these and other reasons, it will be appreciated that there is a practical need to increase the projected debarking chain wear life, thereby reducing chain replacement cost per unit of processed wood products, along with associated costs of replacement materials and machine downtime.

The present invention provides improvements which address these and other limitations associated with the prior art.

SUMMARY OF THE INVENTION

The present invention is preferably a debarking chain configured for attachment to a debarking drum; the debarking chain including a plurality of interconnected chain links, each chain link being a continuous strand of chain material surrounding and defining a central opening through which the continuous strand of any adjacent, interconnected chain links pass; the plurality of interconnected chain links including at least one passing link, the passing link being constructed and arranged to permit the passing link to turn with respect to both adjacent chain links in such a manner that allows impact and stress on the passing link, created by being struck by adjacent or next to adjacent chain links and/or the tree, to be distributed about the continuous strand making up the passing link. In preferred embodiments, the debarking chain will also include at least one drum attachment chain link; the drum attachment chain link being at a first end of a debarking drum and being constructed and arranged to be secured to the debarking drum. The debarking chain will preferably have a drum attachment chain link at each end of the debarking chain, preferably an oblong chain link constructed to correspond to an opening in an outer surface of the debarking drum in which an end link of a debarking chain can be inserted and secured in existing debarking drums. Alternatively, debarking chains having all links be passing links may be used in a debarking drum configured to accept passing links. The present invention also includes a debarking drum including a plurality of such debarking chains, as well as a debarking device having a debarking drum of the type disclosed above, preferably a plurality of such debarking drums. In preferred embodiments, this device will also include or be associated with a chipping device constructed and arranged to chip a wood log into small wood chips suitable for further processing in the pulp or composite lumber industries, respectively. It will be appreciated that it is important to remove bark from such logs prior to the chipping operation in this process.

These and various other advantages and features of novelty which characterize the present invention are pointed out with particularity in the claims annexed hereto and forming a part hereof. However, for a better understanding of the invention, its advantages and objects obtained by its use, reference should be made to the drawings which form a further part hereof, and to the accompanying descriptive matter, in which there is illustrated and described a preferred embodiment of the present invention.

BRIEF DESCRIPTION OF THE DRAWINGS

In the drawings, in which corresponding reference numerals and letters indicate corresponding parts of the various embodiments throughout the several views, and in which the various embodiments generally differ only in the manner described and/or shown.

DETAILED DESCRIPTION

Figure 1:
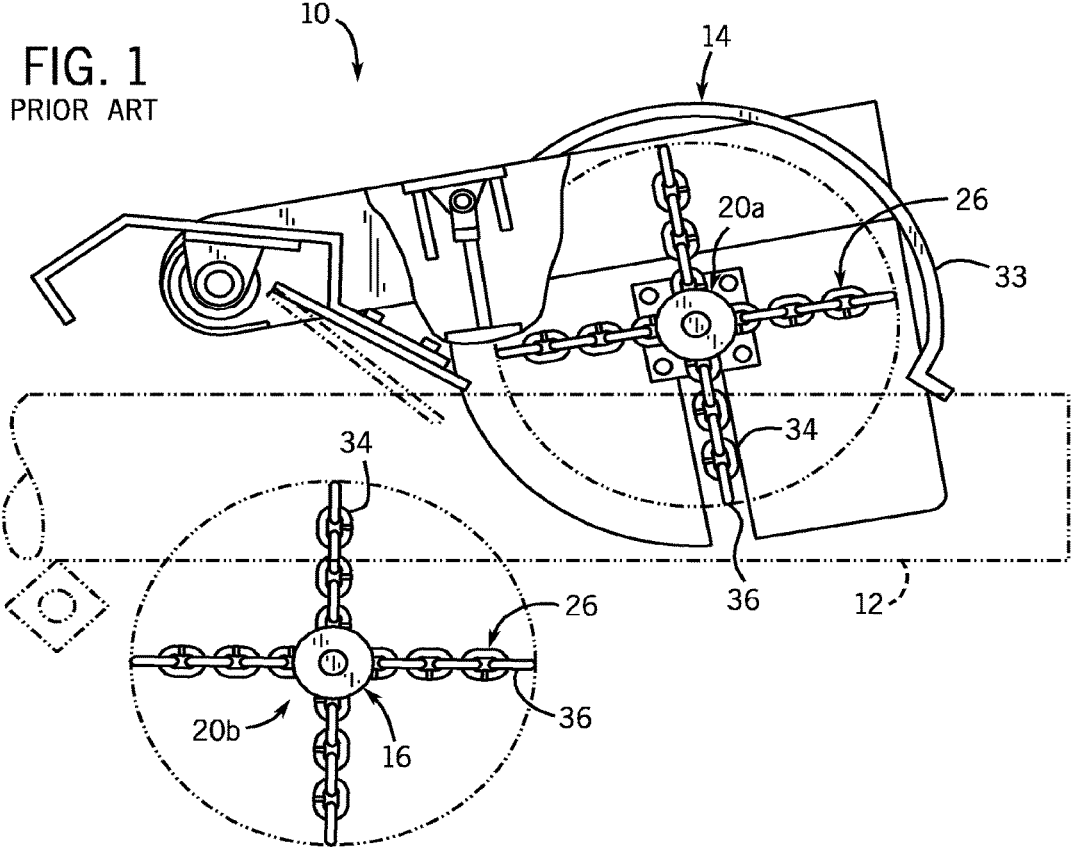
FIG. 1 is a side elevation providing a schematic illustration of a "prior art" debarking/delimbing apparatus.

Debarking devices are commonly used in the wood pulp and composite lumber industries to remove bark and small limbs from the surface of a log prior to chipping the log. As illustrated in the prior art illustration of FIG. 1, one known embodiment of a debarking/delimbing apparatus 10 includes upper and lower debarking units 14 and 16, respectively, having a plurality of debarking chains 26. Each debarking chain 26 is constructed of multiple elongated or oblong chain links 34, which are used to flail the surface of a log 12 to remove bark and small limbs. The wear life of prior art debarking chains is limited by the impact and wear on the respective chain links at the point where adjacent or next to adjacent oblong chain links 34 make contact with adjacent and next to adjacent links when the chain 26 strikes the log 12. The elongated shape of such links is believed to lead to repetitive wear from such stress and such impacts, generally in the same place on the inside and outside surfaces of the rounded portion in the u-shaped end of each link 34. This repetitive wear diminishes the material in these areas and also places repetitive stress upon these areas resulting in a higher degree of metal fatigue; all of which results in a limitation on the useful life of such debarking chains 34.

The prior art debarking/delimbing apparatus 10 shown in FIG. 1 is representative of other similar prior art devices, which also have upper and lower debarking units 14, 16. In many cases, such similar prior art devices will include additional debarking units (not shown) spaced away from the first two units 14, 16. In many cases, the upper debarking unit 14 is a "floating" unit and the lower unit 16 is in a fixed position, as these respective units 14, 16 are. The term "floating" is used to describe a self-adjusting ability. As logs 12 of different diameters are inserted into the debarking machine 14, the debarking machine 14 will pivot up or down in order to accept the log 12 while still remaining close enough to the log 12 in order to debark/delimb. Each debarking unit 14, 16 generally includes a debarking drum 20a, 20b having a cylindrical plate (not shown) similar to the cylindrical plate 222, shown in a debarking drum 220 of the present invention illustrated in FIG. 3, in which the plate 222 has a series of chain receiving openings or pockets 224 in which an end link 236 of each debarking chain 226 can be received and subsequently secured by a securing rod 228, secured by various means known in the art within openings 229 within a hub or hubs 230. The hubs 230, through which a rotating shaft 232 is also secured, permit the debarking drums 20a, 20b to rotate relative to a housing 33. The securing rods 228 are often secured within respective hubs 230 by threaded fasteners (not shown) secured to reciprocally thread ends on the debarking drum (not shown).

It will be appreciated that the debarking drums 20a, 20b rotate at a very high rate of speed and that the debarking chains 26 strike the logs 12 with great force as the logs 12 enter the debarking/delimbing apparatus 10. A great deal of this force is directed to points along the inner and outer perimeter of the surface of each of the respective chain links as they strike adjacent and next to adjacent links. It is commonly observed by persons familiar with debarking/delimbing operations that this is especially the case for the link that is the second from the end closest to the log of any secured debarking chain 26 and also for the link that is third from the end. Indeed, wear to the point of breakage is most often observed in the prior art debarking chains at the second or third link from the end farthest from the drum and closest to the log. The reason for these second and third links of the prior art being most prone to wear and breakage is generally believed to be as follows: 1) the end link closest to the log is free to rotate about its contact area with the adjacent second link. Therefore, impact on the inner and outer circumferential surfaces of the end link is distributed, whereas the contact point on the second link associated with impact from the end link is largely confined to the u-shaped radius of the end of the second link closest to the end link. 2) the end link also strikes the outside surface of the u-shaped end of the third link, while the inside surface of the u-shaped end of the second link impacts the inside surface of the u-shaped end of the third link, thus creating wear in an area of the third link, confined in the prior art debarking chains, to the inside and outside perimeters of the u-shaped end closest to the log. This is the main reason that debarking chains are disconnected and then "flipped" end for end, before being reconnected and used again, because "flipping" the chain concentrates the wear on the links at the other end of the debarking chain and, thereby, extending the wear life for each of debarking chains used in this way.

It will be appreciated, however, that, except for unsecured end links 36, oblong links such as those included in the prior art debarking chains 26, shown in FIG. 1, do not readily change orientation, turn or rotate with respect to each other during use; and the wear and stress from the impact of the respective links 34 is generally concentrated in the rounded, u-shaped ends of these oblong links. It is an object of the present invention to more equally distribute the stress and wear associated with the repetitive impact to the entire inner and outside perimeter of links along the length of a debarking chain and particularly along the inner and outer perimeter of the second and third links at the end of each chain where the wear and stress of such impacts is concentrated.

Figure 2:
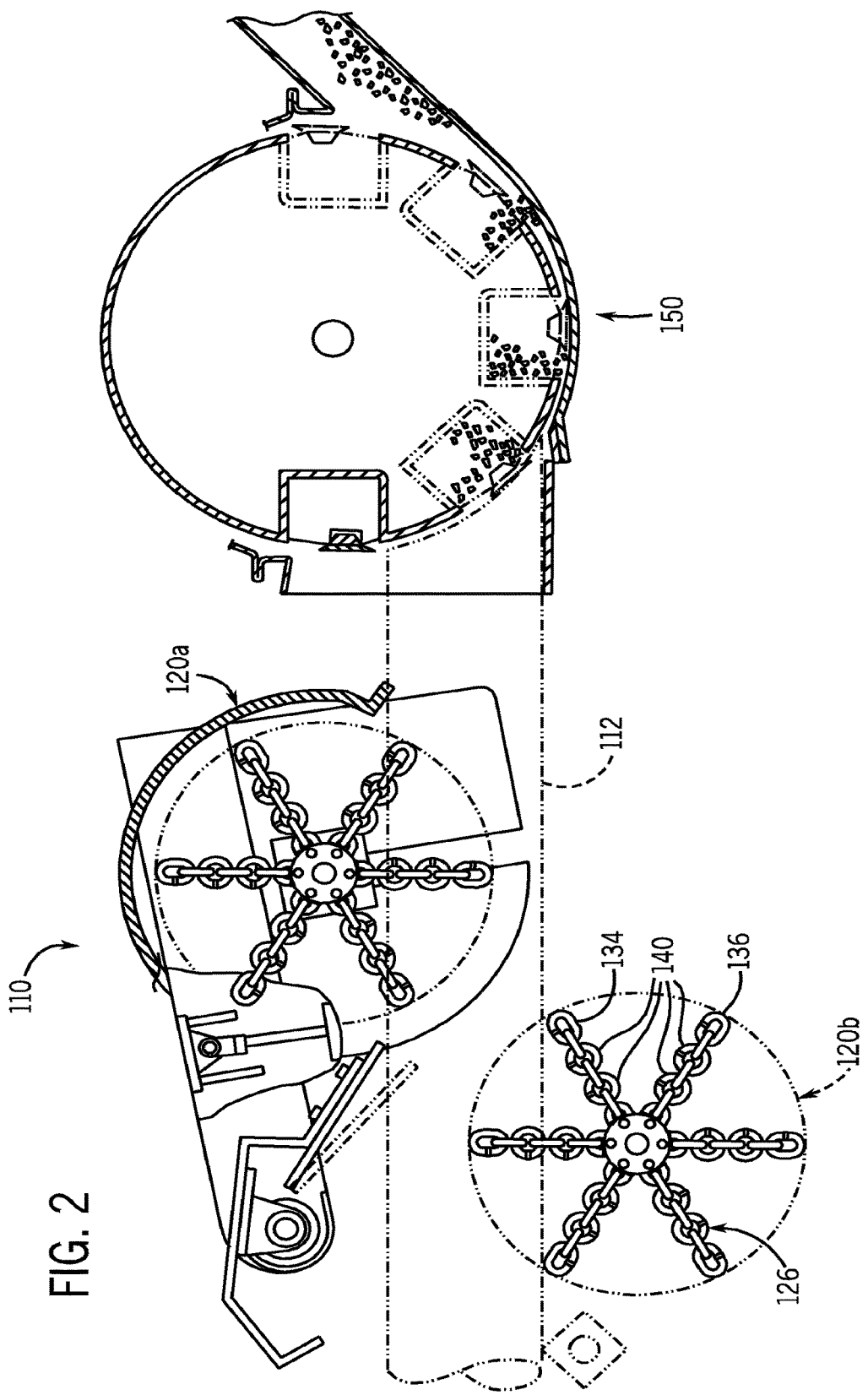
FIG. 2 is a side elevation providing a schematic illustration of a debarking/delimbing/chipping apparatus of the present invention utilizing debarking chains having passing links.
Figure 3:
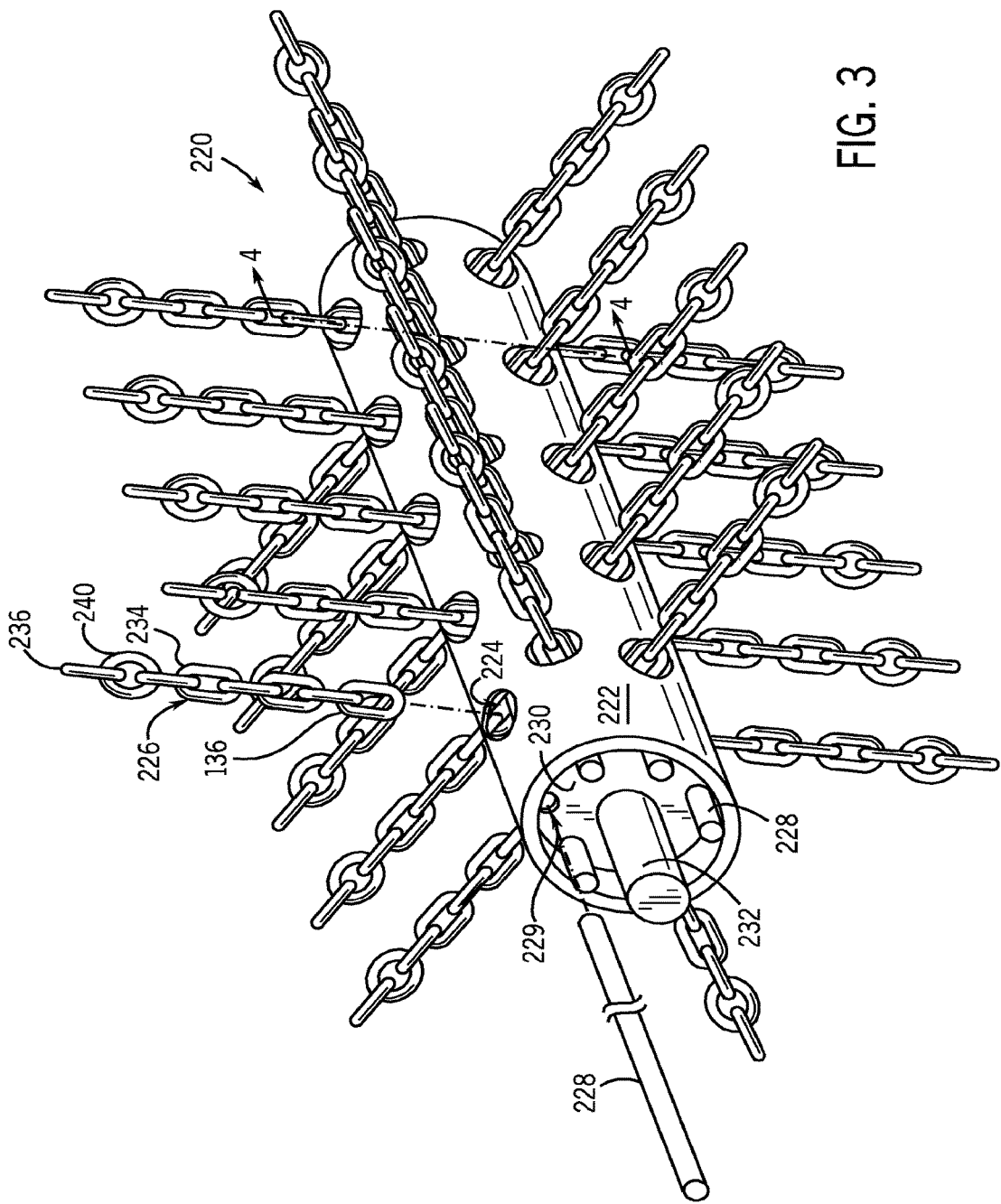
FIG. 3 is a perspective view of an alternate debarking drum 222 of the present invention showing a rod 228 that is removed so that the debarking chains 226 secured by the rod 228 can be detached from the debarking drum 222 and replaced or flipped.

Referring now also to FIGS. 2 and 3 the present invention preferably includes a preferred debarking chain 126, and a preferred debarking drum 120a, 120b and a preferred debarking/delimbing/chipping apparatus 110, each of which includes a number of preferred debarking chains such as debarking chain 126, each of which preferably includes at least one "passing" link 140. Preferred debarking chains 126, shown in FIG. 2, each have a plurality of passing links 140. In the embodiment shown in FIG. 2, each of the links of each of the debarking chains 126 are passing links 140 except for the links 136 at each end of each of the respective debarking chains 126. This embodiment of the invention has the end links 136 that are elongated, oblong links 134, like those in the prior art debarking chains 26 shown in FIG. 1. It is believed that it is important for the end links 136 at each end of these certain preferred debarking chains 126 of the present invention, to be oblong link so that these end links 136 will fit easily into chain receiving openings or pockets (not shown) similar to the pockets 224 shown in FIG. 3 that are common in debarking units that are presently used through out the wood chipping/wood pulping industry. It will be appreciated, however, that a redesigned debarking drum, including a connecting member to connect alternate debarking chains of the present invention (not shown), that are made entirely of passing links, are envisioned as falling within the scope of the present invention.

As defined herein, a "passing" link is a chain link that can substantially rotate, substantially turn or substantially change its orientation with respect to any immediately adjacent link or links during use as one of a series of links in a debarking chain, when the chain is used as a debarking chain in a flailing or debarking operation, without necessarily rotating, turning or changing its orientation more than 90°, and thereby vary its point of engagement with any adjacent links to which it is interconnected, such that any impact, wear or stress upon the link due to interaction with such adjacent links occurring during such flailing or debarking operations will be distributed over a range of impact or wear points along the inner and outer perimeter of the link. A "passing" link, preferably, will not have a u-shaped end, such as the lengthwise ends of an oblong link 34, 134 that, due to the close proximity of the respective sides of the u-shaped end, limit the frequency of any events during such flailing operations in which such a link will change its orientation to its adjacent links. It will be appreciated that "passing" links will have an inner perimeter, surrounding an open space in the center of the link that will be arcuate in at least three different regions 944 of this inner perimeter that may or may not be separated by substantially straight inner perimeter surfaces 946. Ideally, in the most preferred embodiments, the inner perimeter will be a continuously arcuate inner perimeter that is substantially round. In the most preferred embodiments, passing links will be round or substantially round links so that they can be easily reoriented with respect to adjacent links with out being limited by any inner perimeter regions that are either "straight" or without a "turning" or arcuate inner perimeter surface.

It will be appreciated that it is difficult to cost effectively make a perfectly round chain link, therefore, passing links are also envisioned to include generally rounded chain links that have more than two rounded inner perimeter regions, which could be immediately adjacent to one another, that allow the link to easily reorient itself with respect to both of two adjacent links during a flailing operation when such a link is not the end link adjacent only to a single link.

It will be appreciated that passing links are preferably made from elongated or oblong links of welded steel, which are preferably made of carbon steel or other steel alloy, that are "bumped" or struck or pressed with sufficient force on at least two sides or on one side against a generally immovable object, in a manner that permits the shape of the link to become more rounded or arcuate on the surface of the inner perimeter of the link when the force is applied. In preferred processes, the link will be "bumped" simultaneously on opposite ends of a oblong link so that the long straight sides of the link will bend, creating a region along the inner perimeter of the link, proximate an area where the inner perimeter was previously straight, where this region is now bent or arcuate. This bumping step can be repeated or controlled until a desired degree of "roundness" is obtained. Alternatively, the link may be placed in a press, preferably a hydraulic press that will place sufficient force on opposite ends of the oblong link to bend the straight sides. Alternatively, a specialized press or "bumping" device that initially directs force to two opposing sides, but eventually directs force to a plurality of sides of such a link could be designed to produce more evenly rounded links that are most preferred. Alternatively, any link can be reshaped by forcing the link downward along an elongated device having an increasing diameter or dimension that can expand the distance between any two surfaces along the inner perimeter of the link, thereby creating a rounded or arcuate surface along a previously straight region of the inner perimeter. Alternatively, a debarking chain may be formed by taking a chain consisting entirely of passing links and "bumping" or reforming some of the passing links in order to make oblong links.

Figure 11A:
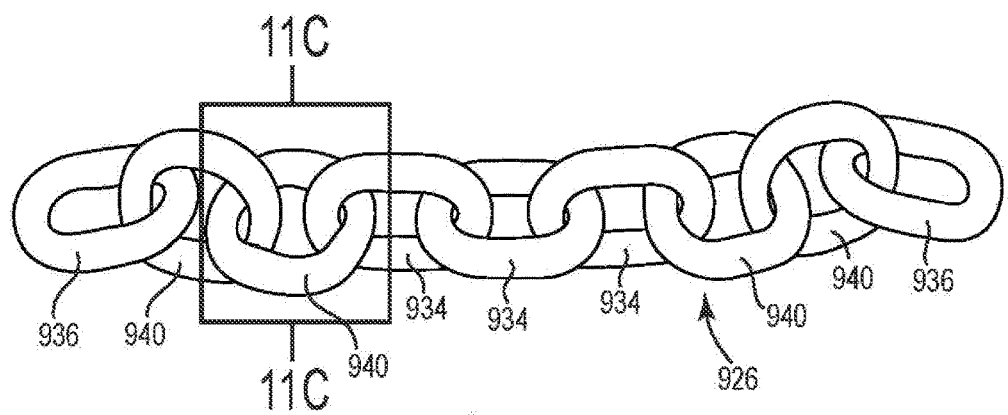
FIG. 11A is a top view illustrating an alternate debarking chain 926 of the present invention which has nine links, four of which, the second and third links from each end, are passing links 940; alternate debarking chains like this were used in Test No. 3, reported in Example I, below.
Figure 11B:
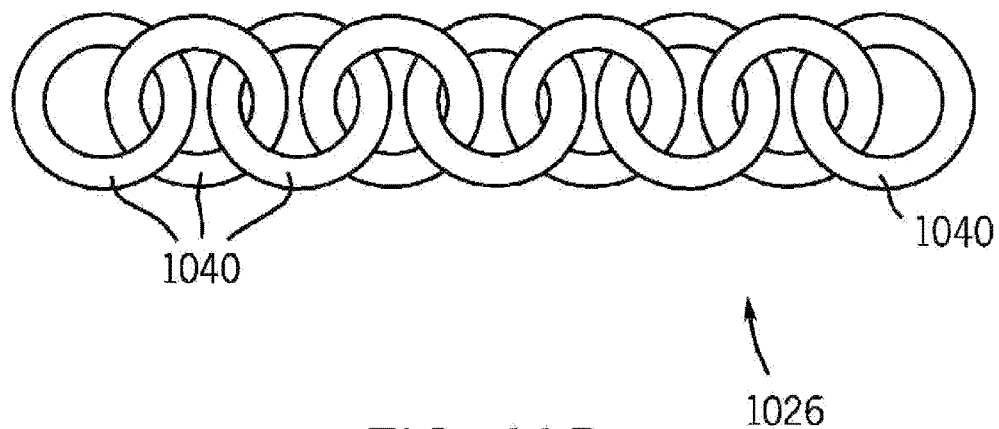
FIG. 11B is a top view illustrating an alternate debarking chain 1026 of the present invention having nine links, all of which are passing links 1040.
Figure 11C:
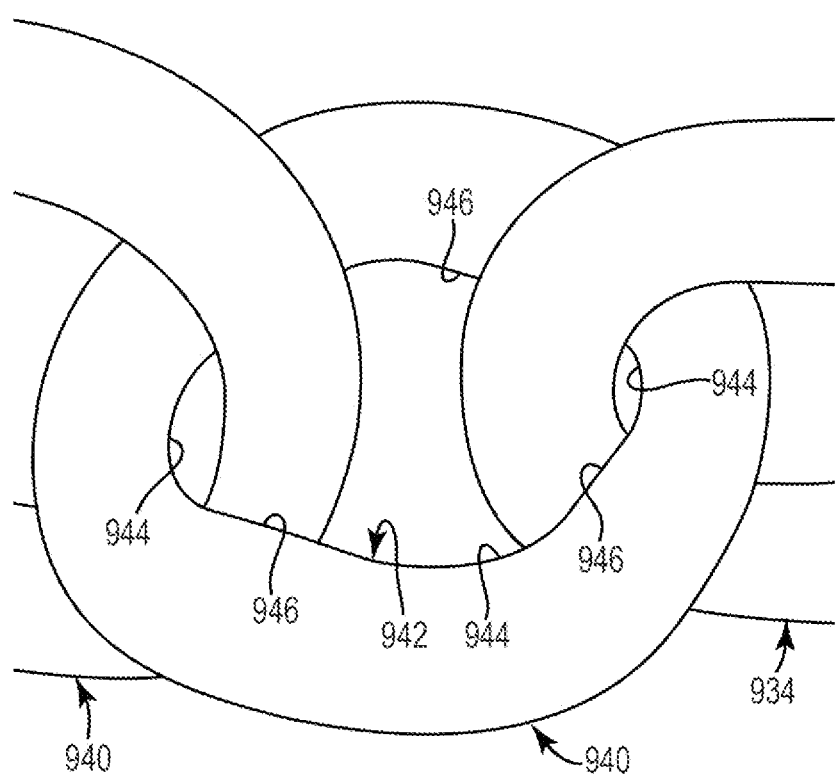
FIG. 11C is an enlarged view of a section of FIG. 11A marked 11C-11C.

It will be appreciated that debarking chains can be made up entirely of passing links (see e.g. FIG. 11B). It is believed that such chain will be generally unusable with present technology, because the debarking drums, that are in current use and/or production, generally require end links that are oblong in order to be received in the "pocket" and secured to the drum. In the future, however, it is envisioned that debarking drums will either be equipped with a securing device that will connect with debarking chains outside of the "pocket" or the "pockets" will be enlarged so that they will be able to receive a passing link or such other rounded link as may be attached to the end of a chain of a part of the end of a chain of the present invention. Furthermore, although a passing link need not be perfectly round in order to pass through adjacent links and turn with respect thereto, round links are certainly passing links. For that reason, a continuous chain made up entirely of round links can be a debarking chain of the present invention, because eventually it is believed the market will change and debarking drums will either be made to accept rounded links or connecting members will be used to engage large end links to debarking drums. Therefore, it is believed that debark chains of the present invention made entirely of passing links in an important aspect of the present invention.

Alternately, a chain made entirely of round links can be used to make debarking chains for the debarking drums most commonly used today, by shaping or "bumping" round links until specific links, most preferably the end links, are oblong in situations where oblong links are needed to be interconnected with present day debarking drums.

The present invention enables users of the preferred debarking chains to expect an increase in the wear life of the debarking chain links by incorporating at least one passing link, preferably at least two adjacent passing links near each end and in certain embodiments, more than two and as many as all of the links other than the end links, and in certain situations, where the debarking drum includes separate chain connecting mechanisms or compatible flail drum pockets (not shown) that will accept a rounded passing link, all of the links can be passing links. In preferred embodiments a passing link is generally a chain link that is substantially round in shape. Substantially round links can randomly pass through adjacent links, turning its orientation with respect to such adjacent links thereby randomly changing the wear or impact point where the respective adjacent or next to adjacent links engage the passing link during repeated flailing events during debarking operations. The wear or impact points will preferably be randomly distributed around the inner and outer perimeter of the passing link. The result of such a random turning or reorientation of the passing link with respect to its adjacent links will preferably be a more evenly distributed wear of the passing links, thereby extending debarking chain wear life as compared to standard debarking chains consisting of elongated oblong links.

As noted above, a debarking apparatus 110 of the present invention, incorporating debarking chains 126 having passing links 140 is illustrated in FIG. 2. The debarking/delimbing apparatus 110 preferably includes upper and lower debarking drums 120a and 120b, respectively. Each debarking drum 120a and 120b, preferably includes multiple debarking chains 126 preferably including both elongated links 134 and passing links 140, which are used to flail the surface of a log 112 to remove bark and small limbs (not shown). Also included in preferred embodiments is an adjacent wood chipper 150, located behind the debarking drums 120a and 120b. In one preferred embodiment of the present invention, the wood chipper 150 is located close enough to the upper debarking drum 120a that debris from a failed chain link may enter the wood chipper 150, causing costly damage and machine downtime. Although it is common practice to replace debarking chains 126 prior to the end of their expected, projected or observed wear life, the expected wear life may be extended by incorporating passing links, thereby realizing a cost savings associated with less equipment down time and more chips per change-out of debarking chains.

The embodiment of the present invention shown in FIG. 2 includes passing links 140 to reside at any point within any debarking chain 126 except at the end links 136 on either end of the debarking chain 126. These links 136 can be used to connect the respective debarking chain 126 to the remaining portion of respective debarking drum 120a, 120b. At the connecting end of each debarking chain 126, an elongated chain link 134 is generally required, for most existing debarking devices, in order to allow the end link 136 to fit within a pocket 224 of the type shown in FIG. 3 that are commonly provided in existing prior art drum cylinders 222 like that shown in FIG. 3.

FIG. 3 illustrates an alternate debarking drum assembly 220 of the present invention. The debarking drum 220 has an outer surface or cylindrical plate 222 having a plurality of chain securing openings or pockets 224 in which an end link 236 can be secured. The debarking drum assembly 220 is configured to allow the end links 236 of the debarking chains 226 to fit into the pockets 224, along an axis perpendicular to the length of the debarking drum assembly 220. The end link 236 of each debarking chain 226 that resides within the pocket 224 is secured by a securing rod 228 that is preferably configured to slide through securing openings 229 in hubs 230 at each of two ends of the cylindrical plate 222 or perhaps at a single end in other embodiments, such that it can reside within the cylindrical plate 222 of the debarking drum 220 along an axis parallel to that of the debarking drum 220 and inserted such that it passes through the end link 136 each of the attached debarking chains 226. Each debarking chain 232 in the debarking drum assembly 220 is preferably constructed to rotate about the shaft or axis 232 at a high rate of speed.

Figure 4:
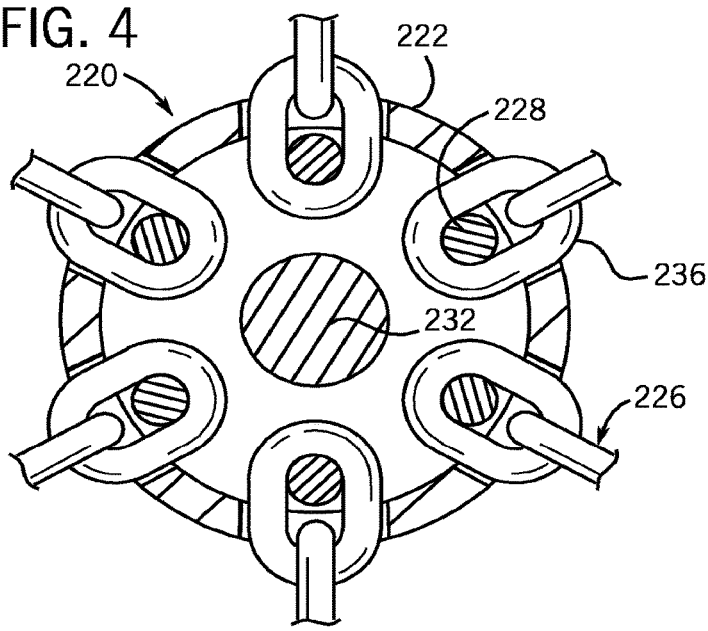
FIG. 4 is a cross sectional view of the alternate debarking drum 222 illustrated in FIG. 3 as seen from the line 4-4 of FIG. 3.

A cut away view from the illustration shown in FIG. 3 is shown in FIG. 4 showing the debarking drum assembly 220 in greater detail. The end link 236 of each debarking chain 226 that passes through the openings or pockets 224 is preferably fastened to a rod 228 secured between hubs 230 at each end of the drum assembly 220.

Figure 5:
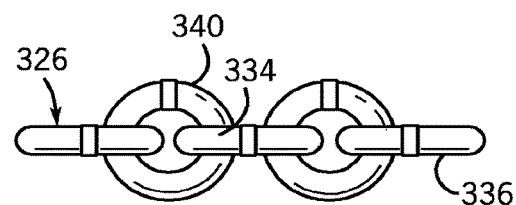
FIG. 5 is a top view illustrating an alternate debarking chain 326 of the present invention having five links, two of which are passing links 340.
Figure 6:
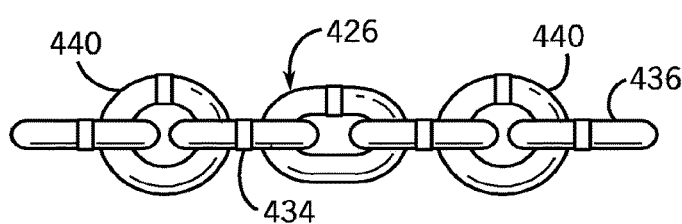
FIG. 6 is a top view illustrating an alternate debarking chain 426 of the present invention having seven links, two of which are passing links 440.
Figure 7:
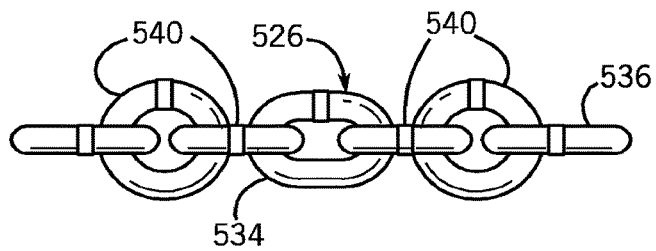
FIG. 7 is a top view illustrating an alternate debarking chain 526 of the present invention having seven links, four of which are passing links 540.
Figure 8:
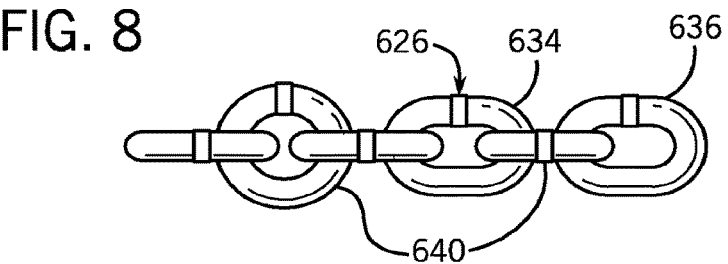
FIG. 8 is a top view illustrating an alternate debarking chain 626 of the present invention having six links, two of which passing links 640.
Figure 9:
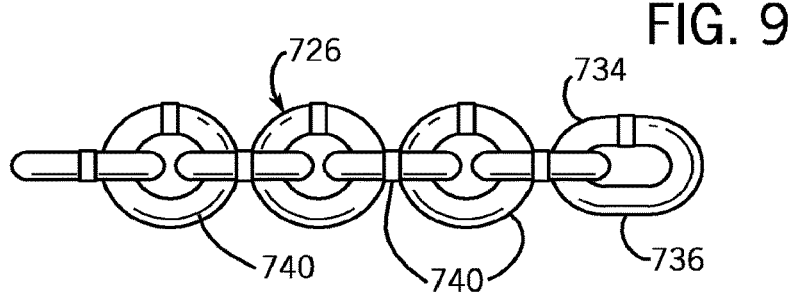
FIG. 9 is a top view illustrating an alternate debarking chain 726 of the present invention having eight links, six of which, i.e. every link except the two end links, is a passing link 740.
Figure 10:
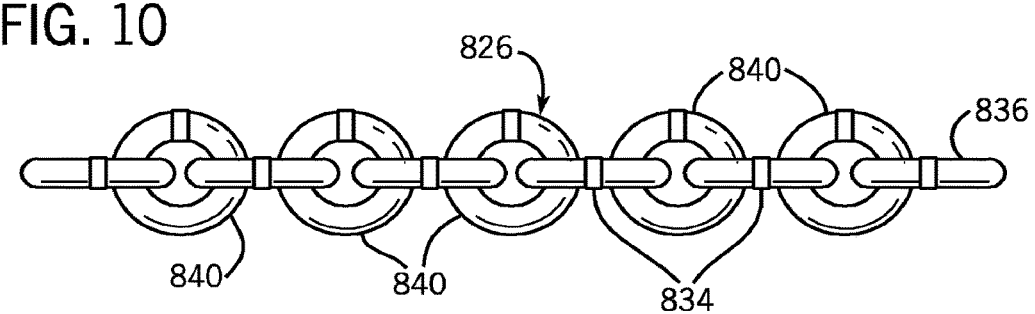
FIG. 10 is a top view illustrating an alternate debarking chain 826 of the present invention having eleven links, where five of eleven links, namely every alternate link starting from the penultimate link at either end of the chain, are passing links 840.

Various embodiments of alternate debarking chain configurations are illustrated in FIGS. 2-10. In FIG. 2, the debarking chains 126 each have seven chain links, five of which are passing links 140 and two of which, namely the end links 136, are elongated links 134 that are elongated and narrower than the passing links 140. In FIGS. 3 and 4, an alternate debarking chain 226 is shown each having eight chain links, only one of which is a passing link 240. FIG. 5 illustrates an embodiment of the present debarking chain 326 having five links, two of which adjacent to each end link 336 are passing links 340. FIG. 6 illustrates an embodiment of the present debarking chain 426 having seven links, two of which, the second link from the end on each side, are passing links 440. FIG. 7 illustrates an embodiment of the present debarking chain 526 having seven links, four of which, the second and third links from each end, are passing links 540. FIG. 8 illustrates an embodiment of the present debarking chain 626 having six links, only two of which, the second links from each end, are passing links 640. FIG. 9 illustrates a further embodiment of the present debarking chain 726 having eight links, six of which, each of the links between the end links 736, are passing links 740. FIG. 10 illustrates yet another embodiment of the present debarking chain 826 having eleven links, five of which, every other link after either of the end links 836, are passing links 840. FIG. 11A illustrates a further alternate embodiment of the debarking chain 926 of the present invention that was prepared for testing purposes in the tests that are reported below in Example I. This chain 926 has nine chain links, four of which are passing links 940. Passing links 940 are the second and third chain links in from each of the two end links 936.

It will be appreciated that preferred debarking chains will have an oblong link 134 in both end positions to accommodate the limitations of existing debarking drum devices that have pockets for securing such chains that generally require an oblong link 134. Any of the links may be passing links, however. In alternate embodiments, the debarking chains of the present invention can have as many as five, six, seven, eight, nine, ten, eleven, twelve, thirteen, fourteen or fifteen links. In alternate embodiments, passing links may be used to connect the debarking chain to in debarking drums that may be plausibly developed to accommodate the debarking chain with passing links on both ends. Such a debarking chain 1026, in which all of the chain links are passing links a1040, is shown in FIG. 11B.

One embodiment of the present invention includes passing links constructed of through hardened steel for increased wear life. In other embodiments, all of the links will be through hardened, although other known methods of hardening the welded steel links can also be employed.

As will become apparent to those skilled in the art, there are numerous variations in the configuration of the debarking chains containing at least one passing link which is within the spirit and scope of the present invention. The length of the chains, number and location of passing links and oblong links are by no means limited to the configurations described herein. Additionally, different arrangements and organization of the various components are also possible.

Example I

Three types of debarking chain were tested at a debarking/chipping facility placing the experimental debarking chains test on the lower flail drum of a Petersen Pacific Debarker Chipper. The types of debarking chain tested were:

Test No. 1—Belt furnace heat treated debarking chains having eight 0.656 inch strand diameter links with an increased Rockwell hardness.

Test No. 2—Link induction furnace heat treated debarking chains having eight 0.656 inch strand diameter links. The link induction furnace heat treated links are believed to have hard ends and softer sides that the belt furnace heat treated links used in Test No. 1.

Test No. 3—Prototypes of the debarking chain of the present invention having passing links as the second and third links from each end of 9-link (0.656 inch strand diameter links) debarking chains. Each of the passing links were bumped in a Piranha Punch (Model: SEPP 35 Punch 35 ton hydraulic press from Piranha, Hutchinson, Kans.) to round the straight sides of the links so that the links became substantial rounded. The intent is to allow these links to rotate, thus distributing the impact point such that the typical high wear areas at each end of the second link and at the base (radius closest to the log) of the third link will be minimized.

All chain types resulted in more loads per change-out of lower front flail drum debarking chain than was typical for the test site. The number of loads achieved was 13, 14 and 14 for Tests No. 1, No. 2, and No. 3 respectively. (typical performance was to achieve 12 loads—6 loads before flipping the chain end for end and 6 loads after flipping).

Test Results:

Test No. 1 chains performed well, even though it was clear to all parties present that, due to the way logs were loaded into the debarker/chipper, the chains on the far left of the flail drum (when viewed from the end of the machine where the logs were fed) experienced excessive wear. This forced the chains to be flipped well before the average wear would have required it had the logs been fed in a more balanced fashion. The chain experienced more even wear across the full width of the flail drum for all subsequent testing after these first six loads.

Test No. 2 chains performed very well in terms of wear, however, they also had the highest number of chain segments with broken and missing links.

Test No. 3 chains performed very well. These chains had the most number of loads after flipping and the only reason they were replaced after 14 loads is because they had "grown" or expanded in length to the point that they were beginning to strike the housing of the flail drum (debarking chains lengthen as interlink wear occurs). Operators, on-site supervisors and key management personnel were very impressed with the prototype Test No. 3 chain. The results indicated that the inclusion of passing links extend the usable wear life of the debarking chain by distributing the impact points, thereby eliminating the localized areas of wear.

Methods:

A Peterson Pacific Model 5000g debarking/chipping machine was used in the testing. A test of further prototypes will follow in which debarking chain similar to that in Test No. 3, will be tested but having only eight links rather than nine with the second and third links from each end bumped into a passing link configuration. The intent is to start a bit shorter so "growth" does not force the chains to be changed out. Additional testing will be conducted with the experimental chain on all three flail drums (we had chosen the worst case scenario, lower front flail drum, as the first test platform).

It is projected that an average increase of one load of chips being produced before and after flipping the chains at a debarking/chipping operation having nine in-field debarking/chipping machines, would result in an annual savings in the cost of debarking chain of about $350,000. Achieving two more loads before and two more loads after flipping is projected to result in a $700,000 savings. It is suggested that this estimate is conservative because it does not take into account the down time and additional labor associated with changing out the debarking chain. Clearly, improving the performance of debarking chain is an important matter for debarking chain users. The monthly cost of operating one debarking/chipping machine, in the winter in a northern North American environment is estimated to be about $26,000 for debarking chain and $23,000 for fuel.

Other pertinent information:
Logs being chipped were mainly aspen, some Russian poplar. The logs were frozen. Aspen and Russian Poplar are considered a hardwood.
The diameter at the base of the logs ranged from 5" to 21". The average diameter was about 8-10 inches.
Each load was 40 to 41 metric tons of chips.
High wear chains were moved to low wear areas of the flail drum and low wear chains were moved to high wear areas when the chain is flipped.

The bark content was measured for each load and reported back to the foreman of the debarking operations. The quality of the chips achieved during testing, averaging less than 1% bark content, was within specification.

fashion, the average smallest diameter of the second link would have been lower (that is, the average wear would have been higher), and more loads would have been achieved before flipping.

TABLE NO. 1

DEBARKING CHAIN PERFORMANCE EXPRESSED IN TERMS OF LOADS PER MILLIMETER OF WEAR AND BROKEN CHAIN SEGMENTS PER LOAD

| | TEST NO. | | |
|---|---|---|---|
| | 1 | 2 | 3 |
| CHAIN TYPE | 0.656 × 8 BELT FURNACE HIGHER ROCKWELL HARDNESS | 0.656 × 8 INDUCTION HEAT TREAT | 0.656 × 9 WITH PASSING LINKS |
| NO. BEFORE FLIP LOADS | 6 | 7 | 6 |
| NO. AFTER FLIP LOADS | 7 | 7 | 8 |
| BEFORE FLIP AVG 2ND LINK SMALLEST DIAMETER (INCHES) | 0.522 | 0.552 | 0.520 |
| AFTER FLIP AVG 2ND LINK SMALLEST DIAMETER (INCHES) | 0.466 | 0.521 | 0.506 |
| BEFORE FLIP AVG 2ND LINK WEAR (MM) | 3.40 | 2.64 | 3.45 |
| AFTER FLIP AVG 2ND LINK WEAR (MM) | 4.83 | 3.43 | 3.81 |
| NO. OF CHAIN SEGMENTS WITH BROKEN OR MISSING LINKS | 10 | 35 | 13 |
| BEFORE FLIP LOADS PER MM OF WEAR | 1.8 | 2.6 | 1.7 |
| AFTER FLIP LOADS PER MM OF WEAR | 1.5 | 2.0 | 2.1 |
| BROKEN CHAIN SEGMENTS PER LOAD | 0.77 | 2.50 | 0.93 |

The lower front flail drum was rotating at 637 rpm.

If all goes as anticipated in any test sequence, it takes 1 to 1½ hours to fill a 2-trailer load.

The debarking operation operates in 2 twelve hour shifts, typically 6 days a week.

Other debarking chain currently being used is Campbell, Rud (made in Brazil) and Honnetaler. The Honnetaler chain was produced at Vistec Chain Company in the Ukraine.

It became clear that the closer the passing links are to being truly round, the longer the wear. The prototype links were somewhat square, which limited the freedom to rotate and reduced the benefit of rotating.

Figure 12:
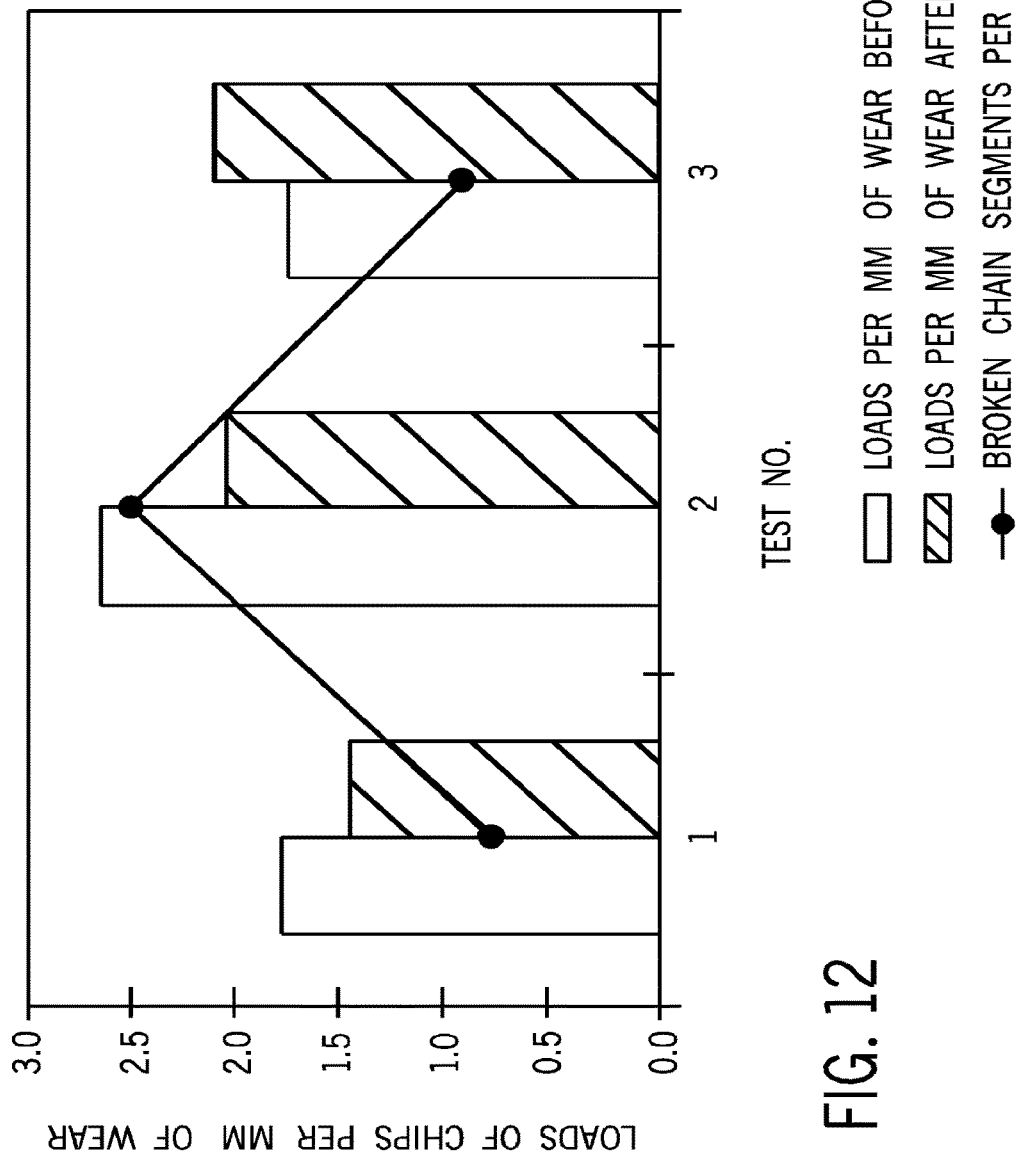
FIG. 12 is a bar graph graphically illustrating the data reported in Table 1, discussed in Example I, below.

The following data in Table 1, below, provides a relative indicator of the performance of debarking chain expressed in terms of the number of loads per millimeter of wear. Wear is determined by subtracting the average smallest diameter of the 2nd link from an original diameter of 0.656 inches. Also shown is the number of broken segments of debarking chain per load. This data is also shown graphically in FIG. 12.

It is noted that the loads per millimeter of wear for Test No. 1 before the chains were flipped is somewhat overstated due to excessive wear occurring on debarking chain segments on the left side (as viewed from the front of the debarking machine). This excessive wear of chains on the left side of the flail drum is associated with the way logs were loaded into the machine. Since chains that were in the middle and on the right side of the flail drum were minimally worn, the average smallest diameter of the second link is overstated. If the logs were loaded in a more balanced It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed:

1. A debarking chain configured for attachment to a debarking drum, the debarking chain comprising:
    a plurality of interconnected chain links including two end links and a plurality of intermediate links that interconnect with each other and the respective end links so that each of the end links are interconnected only with a single intermediate link, each chain link being a continuous strand of chain material defining a central opening through which the continuous strand of any adjacent, interconnected chain links pass, the plurality of intermediate links including at least one passing link;
    wherein an inner perimeter of each at least one passing link includes four arcuate sections, each arcuate section separated from the other by non-arcuate sections, such that the inner perimeter is less than substantially round;
    wherein the plurality of interconnected chain links include at least one drum attachment chain link, the at least one drum attachment chain link being an end link constructed and arranged to be securable to the debarking drum;

wherein the interconnected links include a series of five interconnected passing links; and the interconnected links include a series of three non-passing links, one of which is the drum attachment link.

2. The debarking chain of claim 1, wherein the plurality of intermediate links include at least two passing links.

3. The debarking chain of claim 1, wherein the plurality of interconnected chain links includes at least two passing links.

4. The debarking chain of claim 1, wherein the plurality of interconnected chain links includes two drum attachment chain links.

5. The debarking chain of claim 1, wherein the interconnected links include eight passing links interconnected in series.

6. A debarking chain configured for attachment to a debarking drum, the debarking chain comprising:
a plurality of interconnected chain links including two end links and a plurality of intermediate links that interconnect with each other and the respective end links so that each of the end links are interconnected only with a single intermediate link, each chain link being a continuous strand of chain material defining a central opening through which the continuous strand of any adjacent, interconnected chain links pass, the plurality of intermediate links including at least one passing link;
wherein an inner perimeter of each at least one passing link includes four arcuate sections, each arcuate section separated from the other by non-arcuate sections, such that the inner perimeter is less than substantially round; and
wherein the interconnected links include a series of five interconnected passing links and the interconnected links include a series of three non-passing links, one of which is a drum attachment link.

7. The debarking chain of claim 6, wherein the plurality of intermediate links include at least two passing links.

8. The debarking chain of claim 6, wherein the plurality of interconnected chain links includes at least two passing links.

9. The debarking chain of claim 6, wherein the plurality of interconnected chain links include at least one drum attachment chain link, the at least one drum attachment chain link being an end link constructed and arranged to be securable to the debarking drum; wherein the drum attachment link is a non-passing link.

10. The debarking chain of claim 9, wherein the plurality of interconnected chain links includes two drum attachment chain links.

11. The debarking chain of claim 6, wherein the interconnected links include eight passing links interconnected in series.

* * * * *